US010165138B2

(12) United States Patent
Pilot

(10) Patent No.: US 10,165,138 B2
(45) Date of Patent: Dec. 25, 2018

(54) PRINTING SYSTEM HAVING AN ATTACHED LOCAL USER INTERFACE

(71) Applicant: Océ-Technologies B.V., Venlo (NL)

(72) Inventor: Vincent Pilot, Paris (FR)

(73) Assignee: OCÉ-TECHNOLOGIES B.V., Venlo (NL)

(*) Notice: Subject to any disclaimer, the term of this patent is extended or adjusted under 35 U.S.C. 154(b) by 0 days.

(21) Appl. No.: 15/298,747

(22) Filed: Oct. 20, 2016

(65) Prior Publication Data
US 2017/0118359 A1 Apr. 27, 2017

(30) Foreign Application Priority Data

Oct. 21, 2015 (EP) ..................................... 15190684

(51) Int. Cl.
B41J 3/46 (2006.01)
H04N 1/00 (2006.01)
G03G 15/00 (2006.01)

(52) U.S. Cl.
CPC ............ H04N 1/00493 (2013.01); B41J 3/46 (2013.01); G03G 15/5016 (2013.01); H04N 1/00129 (2013.01); H04N 1/00472 (2013.01); H04N 2201/0089 (2013.01); H04N 2201/0094 (2013.01)

(58) Field of Classification Search
None
See application file for complete search history.

(56) References Cited

U.S. PATENT DOCUMENTS

| 8,913,004 B1* | 12/2014 | Bozarth ............ G06K 9/00604 345/156 |
| 2006/0171734 A1* | 8/2006 | Maeda ............... G03G 15/5016 399/81 |
| 2010/0277762 A1* | 11/2010 | Eguchi ............... G03G 15/5016 358/1.15 |
| 2012/0236340 A1 | 9/2012 | Tsuduki |
| 2014/0294421 A1 | 10/2014 | Takahashi et al. |
| 2016/0191875 A1* | 6/2016 | Nagao ................ G06F 3/04845 348/601 |

FOREIGN PATENT DOCUMENTS

| JP | 2006-231675 A | 9/2006 |
| JP | 2010-54565 A | 3/2010 |
| JP | 2014-89359 A | 5/2014 |
| WO | WO 2008/028738 A1 | 3/2008 |

* cited by examiner

Primary Examiner — Fan Zhang
(74) Attorney, Agent, or Firm — Birch, Stewart, Kolasch & Birch, LLP

(57) ABSTRACT

A printing system includes a local user interface arranged to be attached to the printing system, a plurality of functional modules, and a control system. The local user interface has a display device connected to the control system, and the display device displays information on a display screen. The orientation of the display device may be detected via a determining device. The control system receives the orientation of the display device, upon a change of the orientation of the display device, and automatically determines a functional module of the plurality of modules, which is in an operator's perception view. The display device receives the information regarding the determined functional module and displays this information on an information window. A method for displaying information of a printing system is also disclosed.

9 Claims, 5 Drawing Sheets

PRINTING SYSTEM HAVING AN ATTACHED LOCAL USER INTERFACE

CROSS-REFERENCE TO RELATED APPLICATIONS

This application claims priority under 35 U.S.C. § 119(a) to application Ser. No. 15/190,684.9, filed in Europe on Oct. 21, 2015, the entire contents of which is hereby incorporated by reference into the present application.

BACKGROUND OF THE INVENTION

1. Field of the Invention

The present invention relates to a printing system comprising a local user interface arranged to be attached to the printing system, a plurality of functional modules, and a control system, the local user interface comprising a display device connected to the control system, the display device arranged to display information on a display screen and to have an orientation of the display screen which is changeable, and the printing system comprising a determining device for determining the orientation of the display device.

The term "printing system" is defined herein as a system that has a print function, for example a printer, a copier, a multi-functional, a roll-to-roll printer, a roll-to-sheet printer, a cut sheet printer, a flatbed printer, a wide-format printer, a relief printer or a 3D printer.

The term "functional module" is defined herein as a module that provides a function of the printing system. A functional module of the printing system is for example a media input module, a media output module, a finishing module, a inserter module, a sorting module, a control system of the printing system, a local user interface, a paper path module, a duplex loop of the paper path, a print head unit, an direct image processing drum unit, a flatbed unit for holding media on a flatbed surface, a gantry unit movable over the flat bed surface, a media supply holder, a recording material supply holder, a finishing material supply holder, etc.

The printing system may be an inkjet printing system, an electro-graphical printing system, a nano-particle printing system, etc. The printing system may be suitable for printing on sheets of print media material, on rolls of print media material, or printing 3D objects.

The term "user" and "operator" are both used to indicate a person working with and/or near the printing system according to the invention.

The local user interface is arranged to be attached to the printing system. The local user interface is wired and/or attached to the printing system. The display screen is nevertheless moveable, i.e. has a changeable orientation with respect to the printing system, for example rotatable.

The present invention further relates to a method which is applicable in a printing system according to the invention.

2. Description of the Background Art

Nowadays, printing systems are known which have a display device with a display screen, whose orientation is changeable with respect to the printing system. The display screen is configured to display information about the printing system, for example, a printing schedule, a printing system status, messages for an operator, etc. When an operator wants to have information about a functional module, the information has to be navigated about a functional module, for example via a menu structure, a button activation, a touch of the display screen, a swipe on the display screen, etc.

SUMMARY OF THE INVENTION

An object of the present invention is to provide a printing system that provides more focused information of the printing system to the operator.

The object is achieved in a printing system of the above-mentioned kind, wherein the control system is configured to receive the orientation of the display device determined by the determining device upon a change of the orientation of the display device and to automatically determine a functional module of the plurality such that at a position for a user near the printing system, a direct perception reach of the user includes the determined functional module as well as the display screen of the display device, and to send information of the determined functional module to the display device, and the display device is configured to receive the information of the determined functional module and to display an information window on the display screen, the content of the information window being focused on the information of the determined functional module.

A change of the orientation of the display device may be initiated by the operator by means of a manual action on the display device or an electrically performed automatic displacement of the display device.

The determining device for determining a change of the orientation of the display device may comprise an accelerometer, a magnetometer, and/or simple electric contacts at or near the display device.

When an operator is located close to a functional module of the printing system, which can be perceived by the operator, the operator may perform actions on the functional module. To get information about the functional module, for example the status of the functional module or a required action on the functional module, the orientation of the display device may be changed by the operator, so that the functional module can be perceived, as well as the content of the display screen of the display device. When the orientation of the display device is changed, the displayed information on the display screen is automatically changed, and is focused on information about the perceived functional module.

This is advantageous since the operator immediately has an overview of the status of and required operator actions for the perceived functional module, at which the operator wants to take action. Since the information on the display screen is focused on the perceived functional module, information of non-perceived functional modules may be hidden or shrunk in size on the display screen. The information for the perceived functional module may be displayed in a dedicated window on the display screen. The dedicated window may occupy a larger part of the display screen or the whole display screen.

According to an embodiment, the orientation of the display device is changeable in a direction of a normal to that of the display screen. This can be achieved by a rotation of the display screen in other direction than a direction perpendicular to the display screen.

According to an embodiment, the display device is rotatable around an axis outside the display screen. For example, if a rotatable arm is part of the display device, the arm may be moved to let the complete display device rotate over an angle towards another orientation of the display screen in relation to the printing system.

According to an embodiment, the display device is rotatable around an axis in the plane of the display screen. The display screen itself may be rotatable along a vertical axis in the plane of the display screen or along a horizontal axis in the plane of the display screen.

According to an embodiment, a change of the orientation of the display device is caused by a manual action on the display device by the user.

According to an embodiment, a change of the orientation of the display device is automatically caused by a change of a position of the user relative to the printing system. The user may be equipped with a position determination device like a mobile phone, a card with RFID, a NFC card, etc., which is wireless connected to the printing system.

According to an embodiment, a change of the orientation of the display device is automatically caused by a user action operated upon a functional module of the plurality of functional modules. It is assumed that a user wants to have information about a functional module when he performs a user action on the functional module.

The invention further relates to a method for displaying information of a printing system, comprising a plurality of functional modules and a local user interface, the local user interface comprising a display device connected to a control system of the printing system. The display device is arranged to display information on a display screen, and to have an orientation, which is changeable. Upon a change of the orientation of the display screen, the present orientation of the display screen is determined, which is received by the control system. A functional module of the plurality of functional modules is automatically determined, such that at a position for a user near the printing system, a direct perception reach of the user includes the determined functional module, as well as the display screen of the display device. Information of the determined functional module is sent to the display device for visualization in the information window on the display screen, the display device receives the information of the determined functional module and displays an information window on the display screen. The content of the information window is focused on the information of the determined functional module.

The invention further relates to a computer-program product embodied on a non-transitory computer readable medium and configured to execute a method according to the invention when executed on a processor.

The invention further relates to a non-transitory data carrier having stored thereon the computer-program product according to the invention.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given herein below, and the accompanying drawings, which are given by way of illustration only, and thus are not limitative of the present invention, and wherein.

DETAILED DESCRIPTION OF THE PREFERRED EMBODIMENTS

Figure 1:
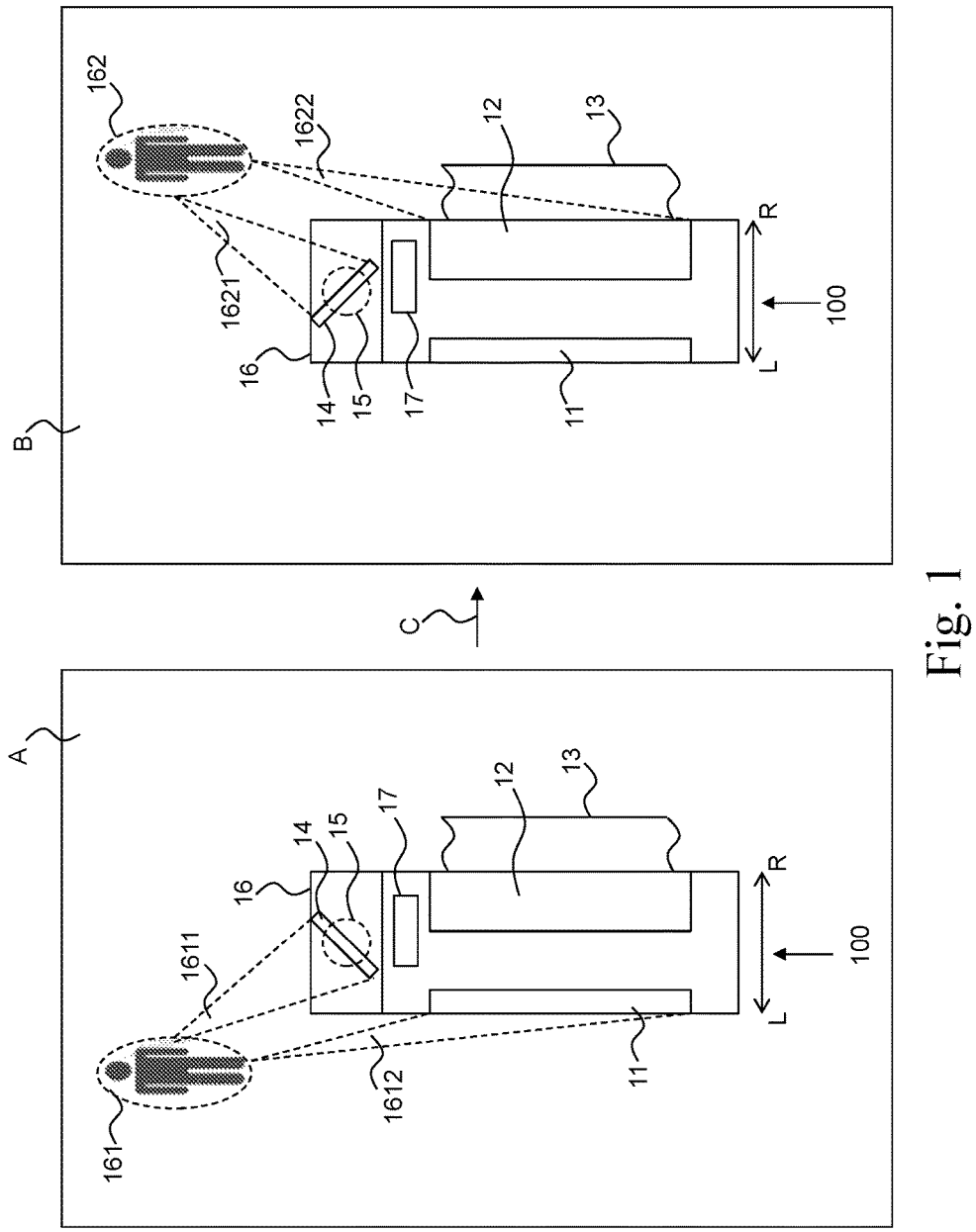
FIG. 1 includes schematic top views of a printing system according to the present invention.

The present invention will now be described with reference to the accompanying drawings, wherein the same reference numerals have been used to identify the same or similar elements throughout the several views.

As an illustrative example, FIG. 1 shows schematically a top view of the printing system 100 according to the invention, for printing print jobs in a first situation A, and in a second situation B after an event C. The printing system 100 comprises a front side 16, a display screen 14 of a display device of the printing system 100, according to the invention, a supply reservoir 17 for colored inks, a left side L comprising a paper input module 11, and a right side R comprising a paper output module 12 outputting a printed medium 13.

In the first situation A, an operator is at a first position 161 on the left side L of the printing system 100, and at the side of the front side 16. The operator has the intention to do some operator actions at the paper input module 11. Therefore, display screen 14 has been turned, which is rotatable along an axis, as indicated by the dashed circle 15. The orientation of the display screen 14 is such that the operator is able to see the paper input module 11 in a first perception reach 1612, limited by dashed lines, and the display screen 14 in a second perception reach 1611, also limited by dashed lines.

According to the invention, the orientation of the display screen 14 is received by the control system (not shown) of the printing system. The control system determines that the paper input module 11 is the functional module of the printing system, which is in the perception reach of the operator. The control system sends information concerning the paper input module 11 to the display device. The display device shows the sent information on the display screen 14 so that the operator can have a look at it.

Figure 2:
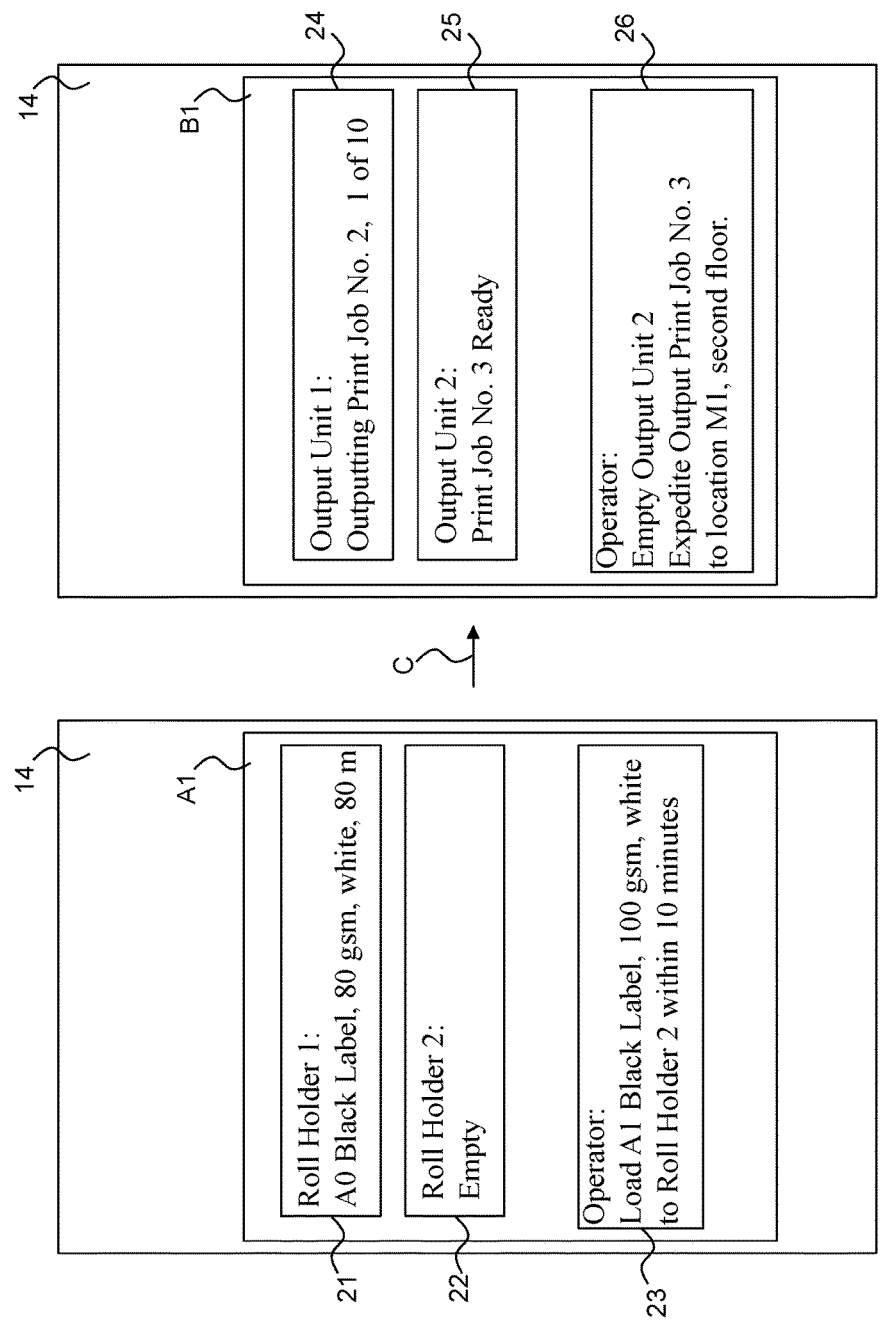
FIG. 2 is showing content on the display screen of the user interface of the printing system according to the present invention.

FIG. 2 shows an example of the content of the display screen 14 in the first situation A.

The display screen 14 shows a large window A1 with information dedicated for the paper input module 11. The information of the paper input module 11 may comprise an information block 21, 22 per paper input holder, and a dedicated operator message block 23 containing one or more requests for operator actions at the paper input module 11.

A second situation B is created after the event C of a position change of the operator.

When the operator wants to go at work at the paper output module 13, for example for unloading printed media 12, he changes his position into a second position 162 on the right side R of the printing system 100 and at the side of the front side 16. He also turns the display screen 14 in his new perception view 1621 as indicated by dashed lines. Also, the paper output module 12 is now in his perception view 1622 as indicated by dashed lines. The determining unit determines a change in the orientation of the display screen 14, and determines the paper output module 12 to be the functional module of the printing system 100, which is in the operator's perception view. The control system sends information concerning the paper output module 12 to the display device. The display device shows the sent information on the display screen 14, so that the operator can have a look at it.

FIG. 2 shows an example of the content of the display screen 14 in the second situation B.

The display screen 14 shows a large window B1 with information dedicated for the paper output module 12. The information of the paper output module 12 may comprise an information block 24, 25 per paper output unit, and a dedicated operator message block 26 containing one or more requests for operator actions at the paper output module 12.

Figure 3:
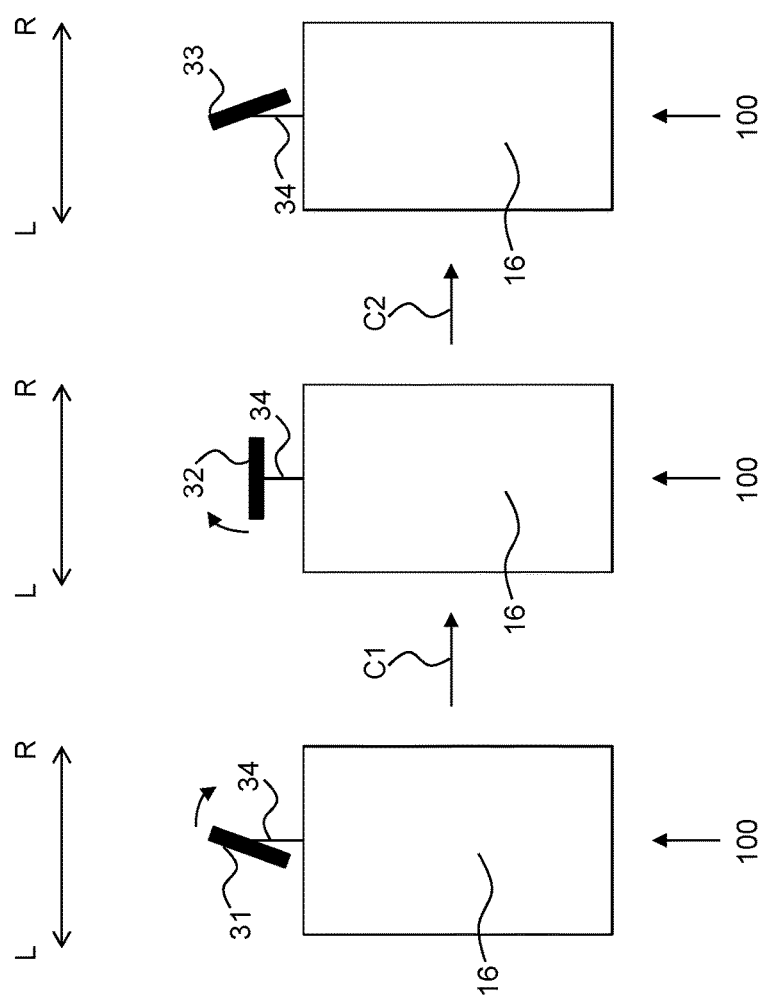
FIG. 3 illustrates the display device rotatable in another direction than the direction in FIG. 1.

Another embodiment of the invention is shown in FIG. 3. FIG. 3 shows a side-view of the printing system 100. Front side 16 is shown, and a rack 34 is positioned on top of the printing system 100. A display screen 31, 32, 33 is attached to the rack 34. The display screen 31, 32, 33 is rotatable at the top of the rack 34 from a first position 31 at the left side L of the printing system 100 via an intermediate position 32, to a second position 33 at the right R of the printing system 100. A rotation axis is a middle axis of the display screen in a direction perpendicular to the plane of the page of FIG. 3.

An event C1 may be the reason for changing the orientation of the display screen from the first position 31 to the intermediate position 32. An event C2 may be the reason for changing the orientation of the display screen from the intermediate position 32 to the second position 33. The events C1, C2 may require a movement of the operator due to the operator's intention to perform an operator action on one of the functional modules of the printing system 100.

When the display screen is in the first position 31, information about functional modules at the left side L of the printing system 100 is displayed on the display screen. When the display screen is in the second position 33, information about functional modules at the right side R of the printing system 100 is displayed on the display screen. When the display screen is in the intermediate position 32, information about the functional module at the top side of the printing system 100 may be displayed on the display screen, for example information about the supply reservoir 17 (shown in FIG. 1) for colored inks.

The content on the display screen changes when the orientation of the display screen goes from the first position 31 to the intermediate position 32. The content on the display screen also changes when the orientation of the display screen goes from the intermediate position 32 to the second position 33.

In another case, the orientation of the display screen may change directly from the first position 31 into the second position 33 without showing content belonging to the intermediate position 32, depending on the speed of the orientation change.

According to an alternative embodiment, the display screen may show a short summary of the complete printing system 100, for example, input media, output media, status, incoming operator actions to perform, etc., when the display screen is in the intermediate position 32.

A change of the orientation of the display device may be initiated by the operator by means of a manual action on the display device, or an electrically performed automatic displacement of the display device. In the embodiments described here-above, a manual action of the operator is executed. However, in an alternative embodiment an electrically performed automatic displacement, rotation, translation, or any other movement of the display screen is executed.

According to an embodiment, the operator's position is detected and received by the control system of the printing system. The control system also has stored the position of the display screen on the printing system. Based on the position of the operator and the position of the display screen, the orientation of the display screen may be adjusted in the direction of the position of the operator such that the display screen arrives in the perception reach of the operator. The determined functional module, which information is to be displayed on the display screen, is dependent on the orientation of the display screen, i.e. coupled to the position of the operator.

The position of the operator may be detected by means of a connection of a mobile device carried by the operator, for example a GPS position track system, or a Bluetooth connection on the mobile device of the operator, an RFID card, a NFC connection, etc.

The position of the operator may be detected by means of an operator event at one of the functional modules of the printing system. For example, the operator opens a media input holder, the operator empties an output holder, the operator removes an empty ink cartridge, the operator places a full ink cartridge, the operator places a staples holder, etc. Since the functional module at which the operator action is carried out is known to the control system of the printing system, the orientation of the display device may be automatically changed into the direction of the operator, and the relevant information dedicated for said functional module is displayed on the display screen of the display device.

Figure 5:
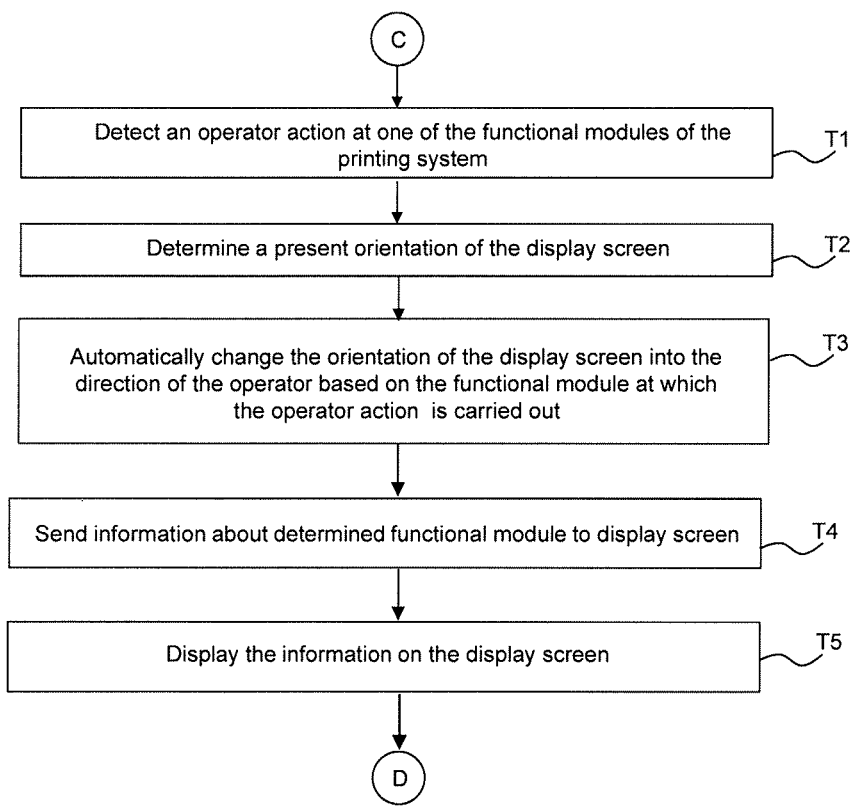
FIG. 5 is a flow diagram of another embodiment of the method according to the present invention.

An embodiment of the method according to the invention is explained in FIG. 5. A starting point C in FIG. 5 leads to a first step T1.

In the first step T1, an operator action at one of the functional modules of the print system is detected.

In the second step T2, the present orientation of the display screen is detected.

In the third step T3, the orientation of the display screen is automatically changed into the direction of the operator based on the functional module at which the operator action is carried out.

In the fourth step T4, information about the determined functional module is sent to the display screen.

In the fifth step T5, the information is displayed on the display screen. The content of the information window is focused on the information dedicated to the determined functional module.

The method ends in the end point D.

According to an embodiment, the operator's position is detected and received by the control system of the printing system. The control system also has stored the position of the display screen on the printing system. Based on the position of the operator and the position of the display screen, the orientation of the display screen may be adjusted in the direction of the position of the operator such that the display screen arrives in the perception reach of the operator. The determined functional module, which information is to be displayed on the display screen is dependent on the orientation of the display screen, i.e. coupled to the position of the operator. The position of the operator may be detected by means of a connection of a mobile device belonging to the operator, for example a GPS position track system on the mobile device.

Figure 4:
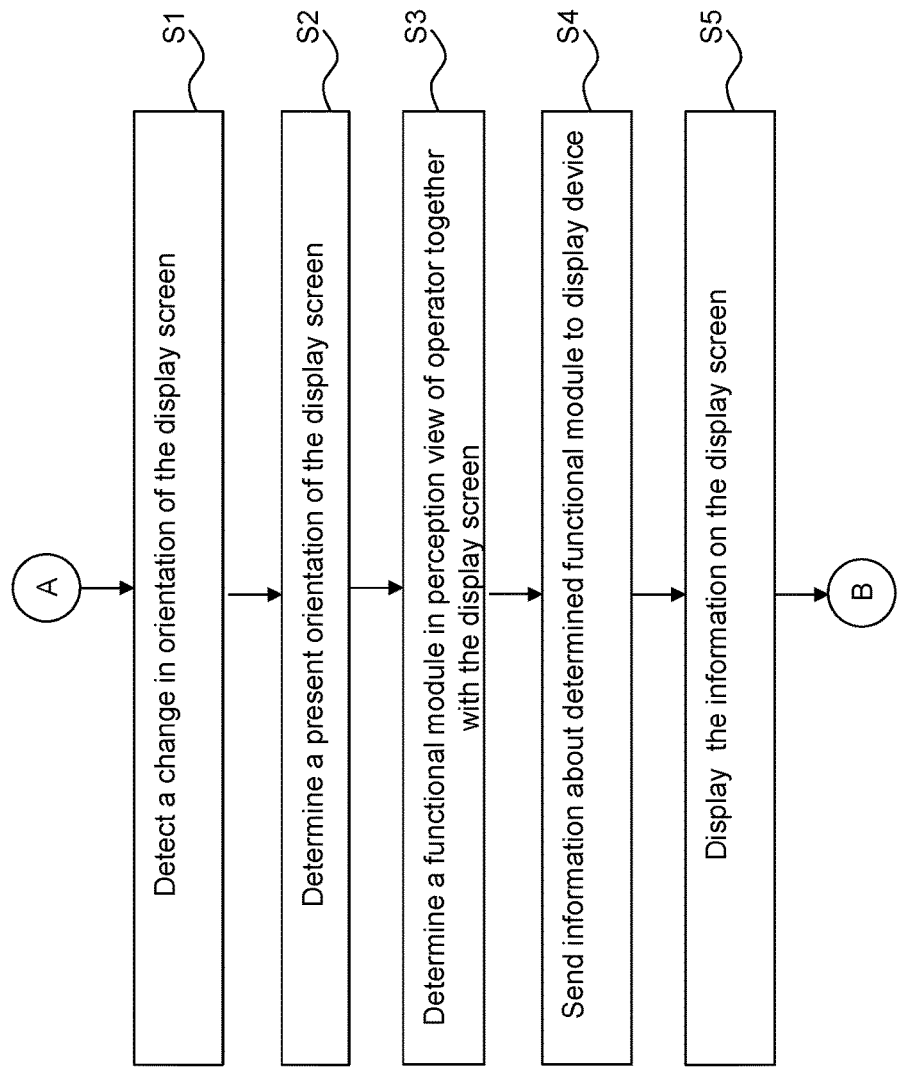
FIG. 4 is a flow diagram of an embodiment of the method according to the present invention.

An embodiment of the method according to the invention is explained in FIG. 4. A starting point A in FIG. 4 leads to a first step S1.

In the first step S1, a change in the orientation of the display screen is detected by the determining device of the printing system according to the invention.

In a second step S2, the present orientation of the display screen is determined by the determining device. The present orientation of the display screen is received by the control system of the printing system.

In a third step S3, a functional module of the plurality of functional modules is automatically determined, such that at a position for a user near the printing system, a direct perception reach of the user includes the determined functional module, as well as the display screen of the display device. The functional module is in the perception view of the operator together with the display screen.

In a fourth step S4, information dedicated to the determined functional module is sent to the display device for visualization in the information window on the display screen. The information dedicated to the determined functional module is received by the display device.

In a fifth step S5, an information window is displayed on the display screen. The content of the information window is focused on the information dedicated to the determined functional module.

The method ends in the end point B.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A printing system comprising:
   a local user interface arranged to be attached at a fixed position to the printing system;
   a plurality of functional modules; and
   a control system,
   wherein the local user interface comprises a display device connected to the control system,
   wherein the display device is arranged to display information about each of the plurality of functional modules on a display screen and to have a changeable orientation,
   wherein the printing system comprises a determining device configured to determine the orientation of the display device,
   wherein the control system is configured to:
   receive the orientation of the display device determined by the determining device upon a change of the orientation of the display device caused by a user action,
   automatically determine a functional module of the plurality of functional modules, such that at a position for the user near the printing system, a direct perception reach of the user includes the determined functional module itself separate from the display device, as well as the display screen of the display device, and
   send information of the determined functional module to the display device,
   wherein the display device is configured to receive the information of the determined functional module and to display an information window on the display screen, the content of the information window being focused on the information of the determined functional module,
   wherein the change of the orientation of the display device is automatically caused by a user action operated upon a functional module of the plurality of functional modules,
   wherein the determined functional module is a print media input module or a print media output module, and
   wherein the display device is configured to shrink in size the display information of functional modules of the plurality of functional modules that are not in the direct perception reach of the user and to focus display information on the display screen of the determined functional module, the display information of the determined functional module includes a status of and required operator actions of the determined function module.

2. The printing system according to claim 1, wherein the orientation of the display device is changeable in a direction normal to the display screen.

3. The printing system according to claim 2, wherein the display device is rotatable around an axis outside the display screen.

4. The printing system according to claim 2, wherein the display device is rotatable around an axis in a plane of the display screen.

5. The printing system according to claim 1, wherein a change of the orientation of the display device is caused by a manual action on the display device by the user.

6. The printing system according to claim 1, wherein a change of the orientation of the display device is automatically caused by a change of a position of the user relative to the printing system.

7. A method for displaying information of a printing system comprising a plurality of functional modules and a local user interface attached at a fixed position to the printing system, the local user interface comprising a display device connected to a control system of the printing system, the display device arranged to display information about each of the plurality of functional modules on a display screen and to have a changeable orientation,
   the method comprising the steps of, upon a change of the orientation of the display screen caused by a user action:
   determining a present orientation of the display screen;
   receiving the present orientation of the display screen by the control system;
   automatically determining a functional module of the plurality functional modules, such that at a position for the user near the printing system, a direct perception reach of the user includes the determined functional module itself separate from the display device, as well as the display screen of the display device;
   sending information of the determined functional module to the display device for visualization in the information window on the display screen;
   receiving the information of the determined functional module by the display device; and
   displaying on the display screen, focused display information of the determined functional module while shrinking in size the display information of functional modules of the plurality of functional modules that are not in the direct perception reach of the user, the display information of the determined functional module includes a status of and required operator actions of the determined functional module, wherein the change of the orientation of the display device is automatically caused by a user action operated upon a functional module of the plurality of functional modules, and wherein the determined functional module is a print media input module or a print media output module.

8. A computer-program product embodied on a non-transitory computer readable medium and configured to execute the method according to claim 7, when executed on a processor.

9. A non-transitory data carrier having stored thereon the computer-program product according to claim 8.

* * * * *